US009742751B2

(12) United States Patent
Jakobsson

(10) Patent No.: US 9,742,751 B2
(45) Date of Patent: Aug. 22, 2017

(54) SYSTEMS AND METHODS FOR AUTOMATICALLY IDENTIFYING AND REMOVING WEAK STIMULI USED IN STIMULUS-BASED AUTHENTICATION

(71) Applicant: PAYPAL, INC., San Jose, CA (US)

(72) Inventor: Bjorn Markus Jakobsson, Portola Valley, CA (US)

(73) Assignee: PAYPAL, INC., San Jose, CA (US)

( * ) Notice: Subject to any disclaimer, the term of this patent is extended or adjusted under 35 U.S.C. 154(b) by 629 days.

(21) Appl. No.: 14/035,817

(22) Filed: Sep. 24, 2013

(65) Prior Publication Data
US 2014/0130126 A1    May 8, 2014

Related U.S. Application Data

(60) Provisional application No. 61/722,726, filed on Nov. 5, 2012.

(51) Int. Cl.
| | | |
|---|---|---|
| G06F 21/36 | (2013.01) | |
| G06F 21/46 | (2013.01) | |
| H04L 29/06 | (2006.01) | |

(52) U.S. Cl.
CPC .............. *H04L 63/08* (2013.01); *G06F 21/36* (2013.01); *G06F 21/46* (2013.01); *G06F 2221/2133* (2013.01); *H04L 2463/144* (2013.01)

(58) Field of Classification Search
CPC .......... G06F 21/31; G06F 21/36; G06F 21/46; G06F 2221/2103; G06F 2221/2113;
(Continued)

(56) References Cited

U.S. PATENT DOCUMENTS 7,703,130 B2 *  4/2010  Pinkas .................... G06F 21/34
                                                                  726/19
7,941,834 B2 *  5/2011  Beck ..................... H04L 63/083
                                                                    726/6
(Continued)

FOREIGN PATENT DOCUMENTS

IL    WO 2012/107879    *  2/2012   ............. G06Q 30/02
IL    WO 2012107879 A2 *  8/2012   ............. G06F 21/31

OTHER PUBLICATIONS

H. Gao, X. Guo, X. Chen, L. Wang and X. Liu, "YAGP: Yet Another Graphical Password Strategy," 2008, Annual Computer Security Applications Conference (ACSAC), Anaheim, CA, pp. 121-129.*

*Primary Examiner* — Eleni Shiferaw
*Assistant Examiner* — Nelson Giddins
(74) *Attorney, Agent, or Firm* — Haynes & Boone, LLP

(57) ABSTRACT

Systems and methods for identifying a weak stimulus in a stimulus-based authentication system is provided. Counters are associated with each stimulus used in the authentication and a first counter is incremented when the stimulus is used in an authentication session and a second counter is incremented when a successful event occurs with respect to the stimulus during the authentication session, but the authentication session ultimately fails. A ratio of the second counter and the first counter is compared to a threshold and the stimulus is identified as weak when the ratio exceeds the threshold. The stimulus may then be removed and no longer be used in the stimulus-based authentication system.

17 Claims, 5 Drawing Sheets

(58) Field of Classification Search
CPC . G06F 2221/2133; H04L 63/08; H04L 63/12; H04L 63/083; H04L 2463/144
See application file for complete search history.

(56) References Cited

U.S. PATENT DOCUMENTS

| | | | | |
|---|---|---|---|---|
| 7,941,836 B2* | 5/2011 | Pinkas | G06F 21/34 | 726/19 |
| 8,312,540 B1* | 11/2012 | Kahn | G06F 21/552 | 713/183 |
| 8,441,548 B1* | 5/2013 | Nechyba | H04N 5/228 | 348/222.1 |
| 8,621,209 B1* | 12/2013 | Johansson | H04L 63/08 | 713/155 |
| 8,713,703 B2* | 4/2014 | Fisk | G06F 21/36 | 726/2 |
| 8,789,139 B2* | 7/2014 | Picard | H04L 63/08 | 380/200 |
| 8,806,219 B2* | 8/2014 | Relyea | G06F 21/31 | 713/182 |
| 8,904,493 B1* | 12/2014 | Dibble | H04L 63/08 | 726/4 |
| 9,003,554 B2* | 4/2015 | Prchal | H04L 63/308 | 342/357.22 |
| 9,027,099 B1* | 5/2015 | Saylor | G06F 21/36 | 705/64 |
| 9,087,187 B1* | 7/2015 | Doane | H04L 9/3226 | |
| 9,092,599 B1* | 7/2015 | Kronrod | G06F 21/31 | |
| 9,137,238 B1* | 9/2015 | Jakobsson | H04L 63/083 | |
| 9,154,303 B1* | 10/2015 | Saylor | H04L 9/3202 | |
| 9,300,643 B1* | 3/2016 | Doane | H04L 63/08 | |
| 9,317,676 B2* | 4/2016 | Liu | G06F 17/30247 | |
| 2003/0191947 A1* | 10/2003 | Stubblefield | G06F 21/36 | 713/183 |
| 2004/0059951 A1* | 3/2004 | Pinkas | G06F 21/34 | 726/5 |
| 2005/0066201 A1* | 3/2005 | Goodman | G06Q 30/02 | 726/19 |
| 2006/0271781 A1* | 11/2006 | Murakawa | G06F 21/31 | 713/168 |
| 2007/0005985 A1* | 1/2007 | Eldar | G06Q 20/206 | 713/183 |
| 2008/0016551 A1* | 1/2008 | Pinkas | G06F 21/34 | 726/2 |
| 2008/0184346 A1* | 7/2008 | Pinkas | G06F 21/34 | 726/5 |
| 2008/0313721 A1* | 12/2008 | Corella | G06F 21/31 | 726/6 |
| 2009/0055910 A1* | 2/2009 | Lee | G06F 21/46 | 726/6 |
| 2009/0150983 A1* | 6/2009 | Saxena | G06F 21/36 | 726/7 |
| 2009/0293119 A1* | 11/2009 | Jonsson | G06F 21/36 | 726/19 |
| 2010/0077209 A1* | 3/2010 | Broder | G06F 21/46 | 713/168 |
| 2010/0077210 A1* | 3/2010 | Broder | G06F 21/46 | 713/168 |
| 2011/0185401 A1* | 7/2011 | Bak | G06F 17/30958 | 726/5 |
| 2011/0208716 A1* | 8/2011 | Liu | G06F 17/30247 | 707/710 |
| 2011/0247067 A1* | 10/2011 | Hirose | G06F 3/0488 | 726/19 |
| 2011/0250867 A1* | 10/2011 | Lee | H04W 12/06 | 455/411 |
| 2011/0296509 A1* | 12/2011 | Todorov | G06F 21/36 | 726/7 |
| 2012/0124664 A1* | 5/2012 | Stein | G06F 15/16 | 726/22 |
| 2012/0222100 A1* | 8/2012 | Fisk | G06F 21/316 | 726/7 |
| 2012/0311342 A1* | 12/2012 | Nuzzi | G06F 21/31 | 713/182 |
| 2013/0007875 A1 | 1/2013 | Jakobsson et al. | | |
| 2013/0019278 A1* | 1/2013 | Sun | G06F 21/36 | 726/2 |
| 2013/0031640 A1* | 1/2013 | Fisk | G06F 21/36 | 726/28 |
| 2013/0036458 A1* | 2/2013 | Liberman | H04L 9/3231 | 726/6 |
| 2013/0041981 A1* | 2/2013 | Kim | H04W 48/16 | 709/217 |
| 2013/0067547 A1* | 3/2013 | Thavasi | G06F 21/32 | 726/7 |
| 2013/0097697 A1* | 4/2013 | Zhu | G06F 21/36 | 726/18 |
| 2013/0198824 A1* | 8/2013 | Hitchcock | G06F 21/00 | 726/6 |
| 2013/0212655 A1* | 8/2013 | Hoyos | G06K 9/00107 | 726/5 |
| 2013/0259330 A1* | 10/2013 | Russo | G06K 9/00087 | 382/124 |
| 2014/0250538 A1* | 9/2014 | Rapaport | G06F 21/31 | 726/28 |
| 2014/0366124 A1* | 12/2014 | Takehara | G06F 21/31 | 726/16 |
| 2016/0316105 A1* | 10/2016 | Nuggehalli | G06F 21/554 | |

* cited by examiner

SYSTEMS AND METHODS FOR AUTOMATICALLY IDENTIFYING AND REMOVING WEAK STIMULI USED IN STIMULUS-BASED AUTHENTICATION

CROSS REFERENCE TO RELATED APPLICATIONS

Pursuant to 35 U.S.C. §119(e), this application claims priority to the filing date of U.S. Provisional Patent Application No. 61/722,726, filed on Nov. 5, 2012, the disclosure of which is hereby incorporated by reference in its entirety.

BACKGROUND

Technical Field

Embodiments disclosed herein are related to systems and methods for automatically identifying and removing weak stimuli used in stimulus-based authentication systems. In particular, systems and methods disclosed herein may identify weak and/or insecure stimuli used in stimulus-based authentication systems by monitoring how often a user correctly identifies the stimulus but fails the authentication.

Related Art

Stimulus-based authentication systems are common for protecting against attackers. Stimulus-based authentication systems include the well-known CAPTCHA system, which places a word, or a series of numbers or letters on the screen, and asks a user to enter the string that is displayed. While such systems have proved to be useful in protecting against attacks, users occasionally have difficulties in deciphering the strings of letters or numbers being displayed, often resulting in failed authentications and user frustration. These difficulties are magnified when users are attempting to authenticate on a mobile device. One solution would be to use less random strings, or strings that are easily identified by users. However, these strings are not as strong and may be easily exploited by attackers.

A system and method that has been developed to improve the authentication process for users on mobile devices relies on presenting stimuli to the user, asking the user to identify the stimulus, and then asking the user to perform one or more actions with the identified stimulus. Such a system and method is described in U.S. patent application Ser. No. 13/174,394, filed Jun. 30, 2011, which is assigned to the same assignee that this application is subject to an assignment to, and the entire contents of which is hereby incorporated by reference in its entirety. A possible problem with this approach is that attackers may be able to capture all of the possible stimuli and be able to develop software that automatically detects the stimuli based on recognition of certain features associated with the stimuli. Moreover, because there may be only a limited number of actions that can be performed with the stimuli, an attacker could theoretically be able to develop a system that is able to succeed at the authentication process a statistically large enough times once all of the images have been captured that it may be a concern.

Figure 1:
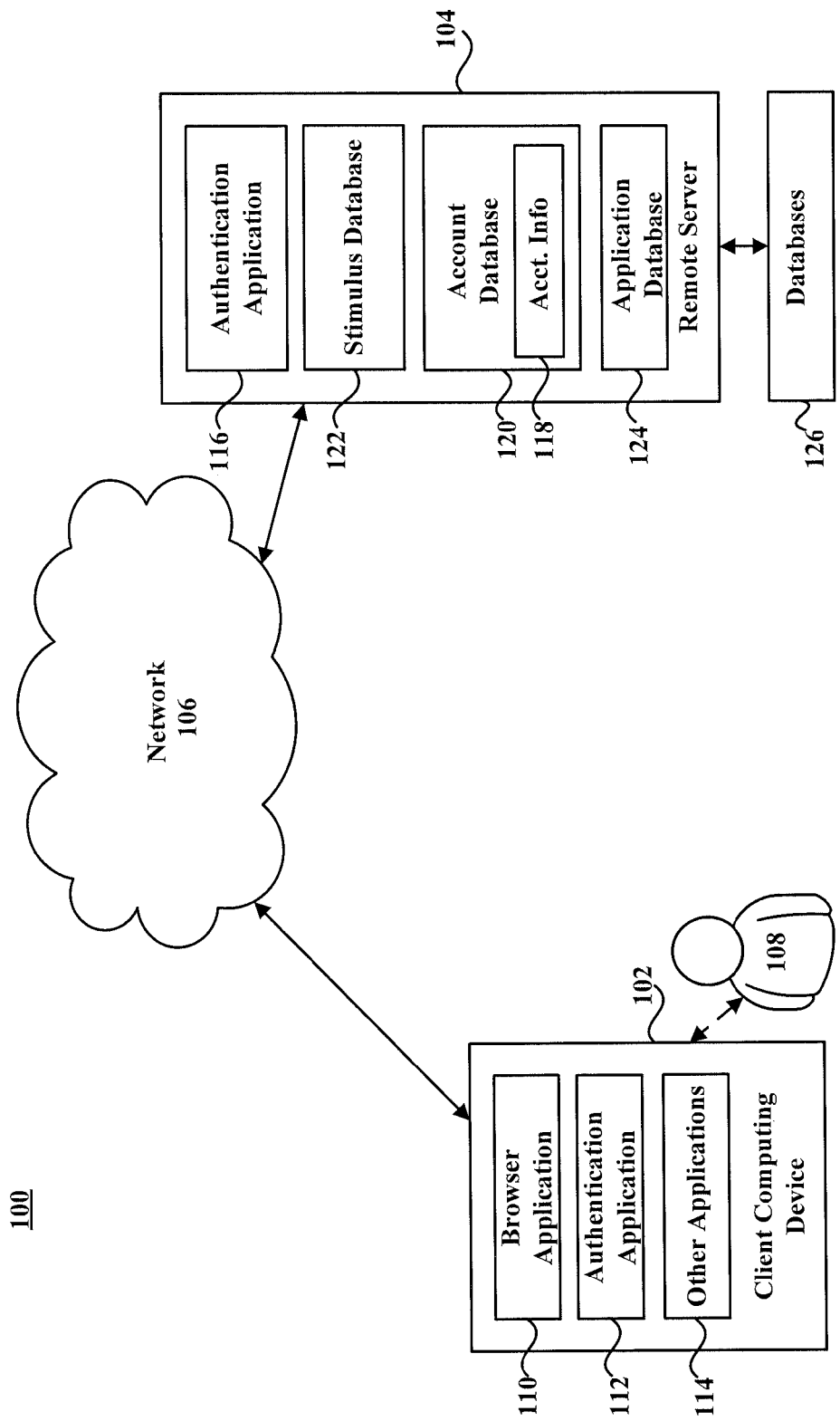
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Accordingly, there is a need for systems and methods that can detect automatically detect weak stimuli and remove these stimuli from use in a stimulus-based authentication processes.

Consistent with some embodiments, there is provided an authentication device. The authentication device includes a memory that is configured to store a plurality of stimuli, a first count associated with each stimulus, and a second count associated with each stimulus. The authentication device further includes a network interface component configured to transmit the stimuli and receive events associated with each transmitted stimulus. The authentication device further includes one or more processors coupled to the memory and the network interface component. The one or more processors increment the first count when a first event occurs and increment the second count when a second event occurs, determine a ratio of the second count to the first count, compare the ratio to a threshold, and calculate an output action when the threshold is met.

Consistent with some embodiments, there is provided a method for identifying a weak stimulus. The method includes transmitting a stimulus from a stimulus database during a stimulus-based authentication session, increasing a first count associated with the transmitted stimulus, increasing a second count associated with the transmitted stimulus if the transmitted stimulus is successfully selected during an authentication round of the authentication session and the authentication session fails, determining a ratio of the second count to the first count, and indicating that the stimulus is vulnerable if the determined ratio exceeds a threshold. The method may be embodied in computer-readable media.

Consistent with some embodiments, there is further provided a method including steps of transmitting at least one stimulus from a stimulus database in response to an authentication request, receiving at least one event related to the transmitted at least one stimulus, incrementing a first count associated with the transmitted at least one stimulus when a first event related to the transmitted at least one stimulus occurs, incrementing a second count associated with the transmitted at least one stimulus when a second event related to the transmitted at least one stimulus occurs, determining a ratio of the second count to the first count, comparing the ratio to a threshold, and determining an output action when the ratio is greater than the threshold. The method may be embodied in computer-readable media.

These and other embodiments will be described in further detail below with respect to the following figures.

FIG. 1 is a block diagram of a networked system 100, consistent with some embodiments. System 100 includes a client computing device 102 and a remote server 104 in communication over a network 106. Remote server 104 may be a payment processing service provider server that may be maintained by a payment processing service provider, such as PayPal, Inc. of San Jose, Calif. Remote server 104 may be maintained by other service providers in different embodiments. Remote server 104 may also be maintained by an entity with which sensitive credentials and information may be exchanged with client computing device 102. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. In some embodiments, the instructions may be executed by the one or more processors in response to interaction by user 108. For example, such instructions may include browser application 110 such as a mobile browser application, which may be used to provide a user interface to permit user 108 to browse information available over network 106, including information hosted by remote server 104. For example, browser application 110 may be implemented as a web browser to view information available over network 106. Browser application 110 may include a graphical user interface (GUI) that is configured to allow user 108 to interface and communicate with remote server 104 or other servers managed by content providers or merchants via network 106. For example, user 108 may be able to access websites to find and purchase items, as well as access user account information or web content.

Client computing device 102 may also include an authentication application 112. In some embodiments, authentication application 112 may prompt user 108 for one or more credentials for authenticating with remote server 104 and providing the credentials to remote server 104. In some embodiments, authentication application 112 may be part of a payment application that may allow user 108 to authorize payments for goods and services (referred to collectively as "items"), with the payments being processed by remote server 104. In some embodiments, authentication application 112 may prompt user 108 for one or more credentials for authenticating with remote server 104. In some embodiments, authentication application 112 may be capable of presenting user 108 with one or more stimulus-based authentication requests for user to perform stimulus-based authentication.

Client computing device 102 may include other applications 114 as may be desired in one or more embodiments to provide additional features available to user 108, including accessing a user account with remote server 104. For example, applications 114 may include interfaces and communication protocols that allow the user to receive and transmit information through network 106 and to remote server 104 and other online sites. Applications 114 may also include security applications for implementing client-side security features, programmatic client applications for interfacing with appropriate APIs over network 106 or various other types of generally known programs and/or applications.

Remote server 104, according to some embodiments, may be maintained by an online payment provider or payment processor, such as PayPal, Inc. of San Jose, Calif., which may provide processing for online financial and information transactions on behalf of user 108. Remote server 104 may include an authentication application 116 that, in some embodiments, may be in communication with authentication application 112 over network 106 for authenticating user 108 to remote server 104. In some embodiments, authentication application 118 may receive one or more credentials provided by authentication application 112 of client computing device 102 for matching to credentials stored in user account information 118 in account database 120. Such credentials may include stimulus-based credentials or challenges or credentials such as a username, password, Personal Identification Number (PIN), and the like.

Remote server 104 may also include a stimulus database 122 that stores stimuli for use by authentication application 116 in stimulus-based authentication. Stimulus database 122 may also include two or more counters associated with each stimulus, wherein each time a user is presented with a stimulus and selects the stimulus during authentication a first counter is increased and each time a user selects the correct stimulus but fails authentication, a second counter is increased. Stimulus database 122 may also generate a log associated with each stimulus which may be stored in a memory of remote server 104 for analysis and use in determining when a stimulus is a weak or easily copied stimulus. Consistent with some embodiments, authentication application 116 may automatically identify stimuli used by stimulus authentication application 116 that are weak or insecure and remove these stimuli from stimulus database 122 based on a ratio of the counters associated with each stimulus. Consistent with some embodiments, stimulus or stimuli may refer to an image, a transformation of an image such as a rotation, an inversion, or a cropping of the image. Stimulus or stimuli may also refer to a combination of images or a sound or other media, or a string of words or characters.

Remote server 104 may include other applications in an application database 124 and may also be in communication with one or more external databases 126, that may provide additional information that may be used by remote server 104. Applications included in application database 124 may include applications for purposes other than authentication, including applications for conducting financial transactions and shopping and purchasing items. In some embodiments, databases 126 may be databases maintained by third parties, and may include third party account information of user 108.

Although discussion has been made of applications and applications on client computing device 102 and remote server 104, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
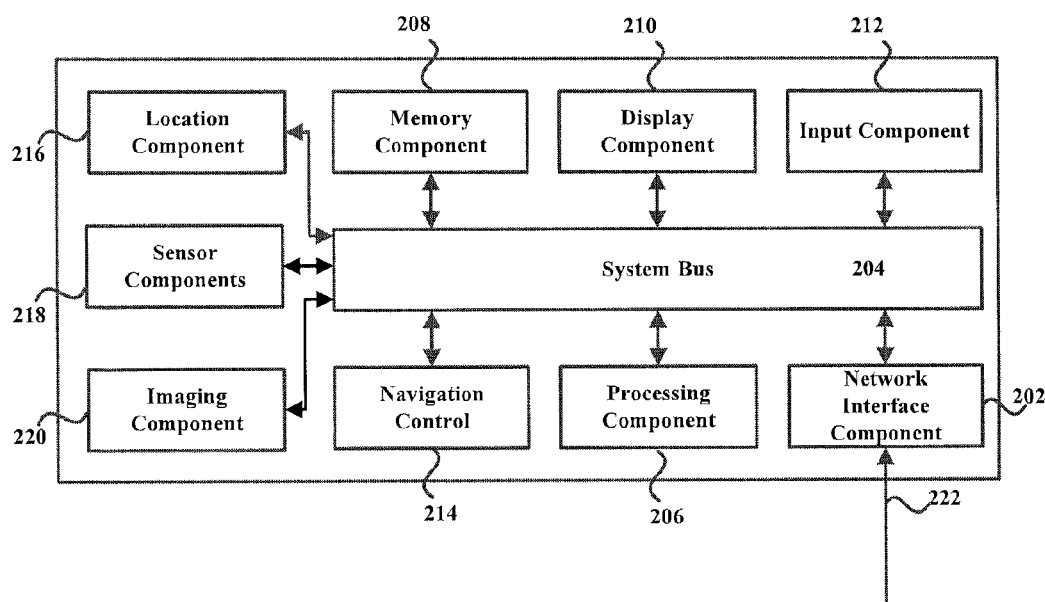
FIG. 2 is a diagram illustrating a computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 106. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs), and a memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user 108 of computing system 200. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as user 108, to input information to computing system 200. Such information could include payment information such as an amount required to complete a transaction, account information, authentication information such as a credential, or identification information. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if device 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into client computing device 102 or sensor peripherals coupled to client computing device 102. Sensor components 218 may include any sensory device that captures information related to user 108 and/or client computing device 102 that may be associated with any actions that user 108 performs using client computing device 102. Sensor components 218 may include accelerometers, biometric readers, GPS devices, and other devices that are capable of providing information about client computing device 102 or user 108, or an environment therearound.

Computing system 200 may also include am imaging component 220. In some embodiments, imaging component 220 may be an optical camera capable of capturing images. In some embodiments, the captured images may be a series of captured images, such as video frames. Imaging component 220 may be used by authentication application 112 of client computing device 102 to capture motion or movement by user 108 to use as motion-based credentials.

Computing system 200 may perform specific operations by processing component 206 executing one or more sequences of instructions contained memory component 208. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks and volatile media includes dynamic memory. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3:
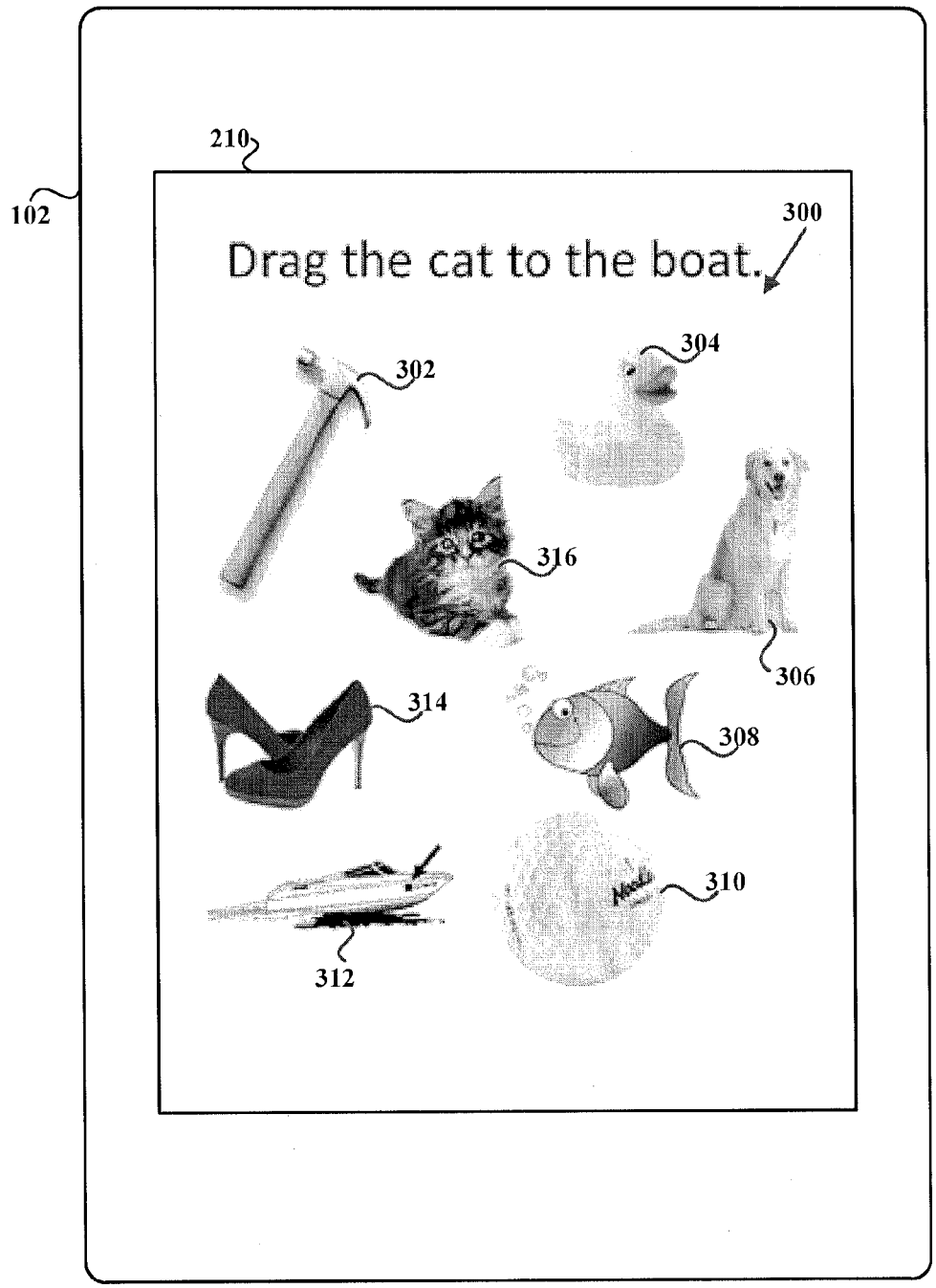
FIG. 3 is a diagram illustrating a screenshot of a stimulus-based authentication, consistent with some embodiments.

FIG. 3 is a diagram illustrating a screenshot of a stimulus-based authentication, consistent with some embodiments. As shown in FIG. 3, display component 210 of client computing device 102 may display an interface 300 including a number of stimuli for use in a stimulus-based authentication, including images of a hammer 302, a rubber duck 304, a dog, 306, a goldfish 308, a golf ball 310, a boat 312, shoes 314, and a cat 316. As part of the authentication, user 108 may be asked to drag cat image 316 to boat image 312. Consistent with some embodiments, a stimulus-based authentication may be referred to as an authentication session, wherein the entire session includes multiple rounds. For example, a first round of the session may require user 108 to select cat image 316. A second round of the session may require user 108 to drag cat image 316 to boat image 312. A third round may of the session may require user 108 to select hammer image 302. A fourth round of the session may require user 108 to drag hammer image 302 to golf ball image 310, and so on until the session ends and authentication is completed.

An attacker attempting to crack the stimulus-based authentication system may be able to perform an image capture on images 302-316, and continue capturing images until all images or other stimuli in stimulus database 122 have been captured. The attacker may then be able to perform stimulus recognition algorithms on the captured stimuli to identify certain features that enable an automatic attack to identify the stimulus. For example, cat image 316 may be notable due to its two pointed ears. An attacker may be able to use this feature to identify all stimuli having two pointed ears as being cat image 316. Consequently, when presented with a stimulus-based authentication that requests that cat image 316 be selected during an authentication round, an automated attack can scan the displayed stimuli for one that has two pointed ears, and effectively pass that round. However, an attacker is likely to have more difficulties with rounds that require manipulation of a stimulus. Despite these difficulties, it is still possible for an attacker to identify all possible manipulations that could be required in an authentication round. Having already determined all of the stimuli in stimulus database 122, the attacker could perform a brute force attack that keeps attempting authentication until the correct manipulation is performed to pass that round.

As a result, to improve these stimulus-based authentication systems, it may be important to identify stimuli that are successfully identified during a round but the authentication ultimately fails during another round. Such identifications may be indicative of an attempted attack, and it may be important for future security to remove the selected stimulus from stimulus database 122 as it may be insecure and/or weak, and easily identifiable by an attacker.

Figure 4:
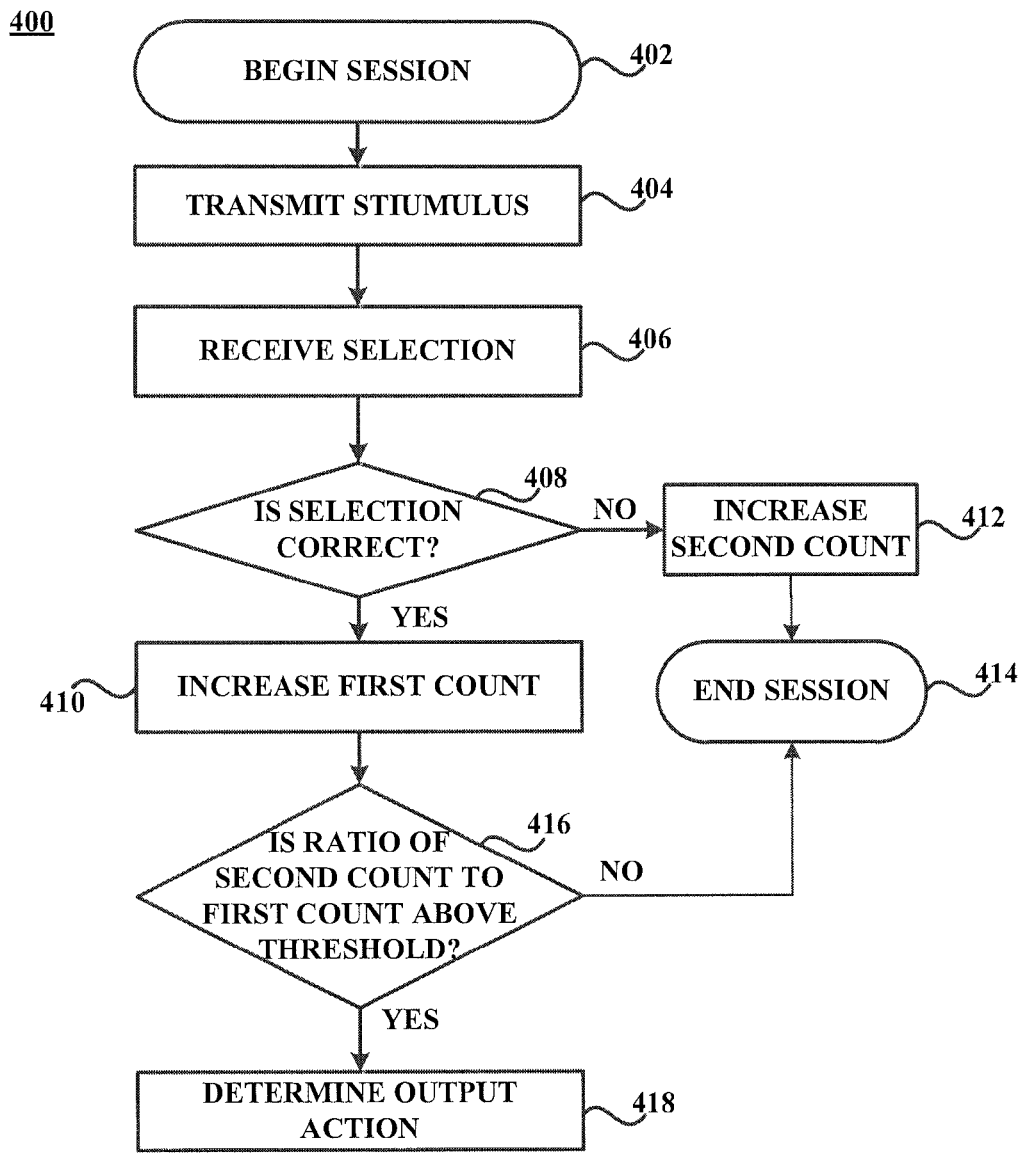
FIG. 4 is a flowchart illustrating a process for automatically identifying weak images, consistent with some embodiments.

FIG. 4 is a flowchart illustrating a process 400 for automatically identifying weak images, consistent with some embodiments. For the purpose of illustration, FIG. 4 will be described with reference to FIGS. 1-3. Process 400 shown in FIG. 4 may be embodied in computer-readable instructions for execution by one or more processors such that the steps of process 400 may be performed by remote server 104. In some embodiments, authentication application 116 of remote server 104 may include instructions for performing one or more steps of process 400. As shown in FIG. 4, the method begins when remote server 104 begins a session (402). As described above, a session is an authentication session that may include one or more rounds that user 108 must pass before they can be authenticated. As part of a round of the session, remote server may then transmit a stimulus (404). Consistent with some embodiments, the transmitted stimulus may be an image, a transformation, a combination of an image and a transformation, a combination of images, or a sound or other media, or a string of words, letters, phrases, and the like. Moreover, the transmitted stimulus may be retrieved from stimulus database 122 and transmitted to client computing device 102 for user 108 to select and/or manipulate as part of an authentication process initiated by authentication application 116. Remote server 104 may then receive a selection, identification, or manipulation of the transmitted stimulus as part of a round of the session (406). Remote server 104 may then determine whether the selection, identification, or manipulation of the stimulus is correct (408). When the selection, identification or manipulation of the stimulus is correct, a first count associated with that stimulus may be increased (410). The first count may be an indication that an action taken with respect to the first stimulus has been successful. When the selection, identification, or manipulation is not correct, a second count may be increased (412) and the session may be ended (414). In some embodiments, the second count may be an indication that an action taken with respect to the first stimulus has not been successful. In some embodiments, the first count may generally be an indication that a first event has occurred, and the second count may be an indication that a second event has occurred. In the embodiment shown in FIG. 4, the first event occurring may be a when a successful interaction occurs with the stimulus and the second event occurring may be when an unsuccessful interaction occurs with the stimulus. As described above, an authentication may include additional rounds after a first initial round where user 108 is asked to, for example, select, identify, or manipulate the transmitted stimulus. These additional rounds may include requiring user 108 to further select, identify, or manipulate the stimulus or additional stimuli. In some such embodiments, the first event occurring may correspond to a successful authentication round, and the second event may correspond to an unsuccessful authentication round.

Consistent with some embodiments, the first and second counts may be specifically associated with the transmitted stimulus and be stored along with the stimulus in stimulus database 122. In some embodiments, stimulus database 122 may include a log of the instances when a first or second count occurs, including details regarding the first and second count. Remote server 104 may determine if a ratio of the second count associated with the transmitted stimulus to the first count associated with the transmitted stimulus meets or is above a threshold (416). When the ratio is determined to be above this threshold, remote server 104 may then determine an output action with respect to the transmitted stimulus (418). In some embodiments, the determined output action may be removing the stimulus from stimulus database 122. Consistent with some embodiments, the determined output may be to identify the transmitted stimulus as being statistically vulnerable. At this point, remote server 104 may simply note the vulnerability in stimulus database 122 and take action later. If the ratio is not determined to meet or be above the threshold, nothing is done, and the session is ended (414). Although the steps shown in FIG. 4 are described as being performed by remote server 104, they may also be performed by client computing device 102, or a combination thereof.

Figure 5:
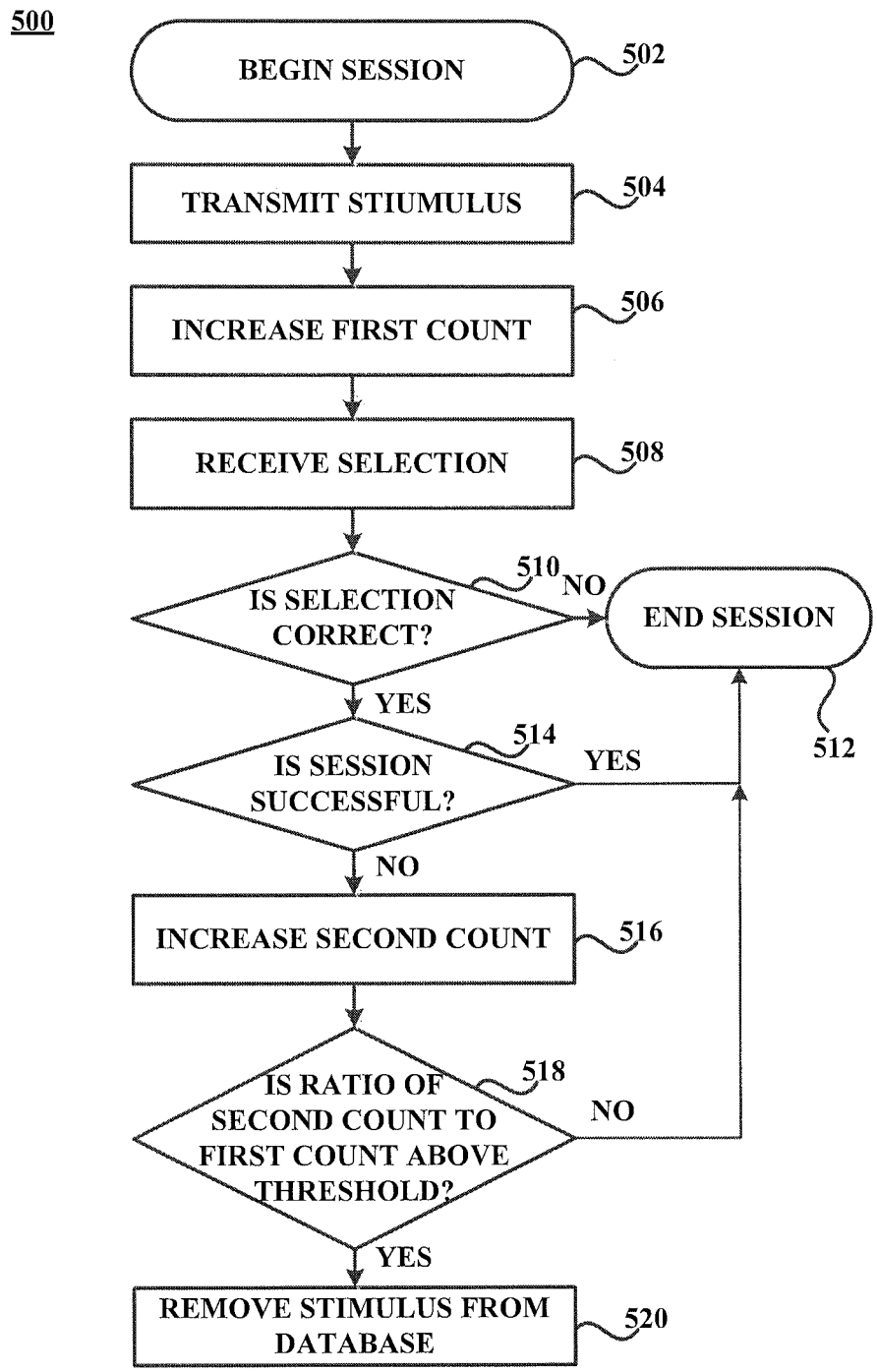
FIG. 5 is a flowchart illustrating a process for automatically identifying weak images, consistent with some embodiments.

FIG. 5 is a flowchart illustrating a process 500 for automatically identifying weak images, consistent with some embodiments. For the purpose of illustration, FIG. 5 will be described with reference to FIGS. 1-3. Process 500 shown in FIG. 5 may be embodied in computer-readable instructions for execution by one or more processors such that the steps of process 500 may be performed by remote server 104. In some embodiments, authentication application 116 of remote server 104 may include instructions for performing one or more steps of process 500. As shown in FIG. 5, the method begins when remote server 104 begins a session (502). As described above, a session is an authentication session that may include one or more rounds that user 108 must pass before they can be authenticated. As part of a round of the session, remote server may then transmit a stimulus (504). Consistent with some embodiments, the transmitted stimulus may be an image, a transformation, a combination of an image and a transformation, a combination of images, or a sound or other media, or a string of words, letters, phrases, and the like. Moreover, the transmitted stimulus may be retrieved from stimulus database 122 and transmitted to client computing device 102 for user 108 to select and/or manipulate as part of an authentication process initiated by authentication application 116. When the stimulus is transmitted, a first count associated with that stimulus may be increased (506). The first count may be an indication that the particular stimulus has been used in an authentication session, and may be stored along with the stimulus in stimulus database 122. Remote server 104 may then receive a selection, identification, or manipulation of the transmitted stimulus as part of a round of the session (508). Remote server 104 may then determine whether the selection, identification, or manipulation of the stimulus is correct (510). When the selection, identification, or manipulation is not correct, the session may be ended (512). When the selection, identification, or manipulation is correct, remote server 104 may further determine if the session is successful (514). As described above, an authentication may include additional rounds after a first initial round where user 108 is asked to, for example, select, identify, or manipulate the transmitted stimulus. These additional rounds may include requiring user 108 to further select, identify, or manipulate the stimulus or additional stimuli.

When the session is successful, that is, if user 108 completes all of the rounds of the authentication session, user 108 may be authenticated to remote server 104 and the authentication session ends (512). However, when the session is not successful, a second count is increased (516). Consistent with some embodiments, the second count may be specifically associated with the transmitted stimulus and be stored along with the stimulus in stimulus database 122. Remote server 104 may determine when a ratio of the second count associated with the transmitted stimulus to the first count associated with the transmitted stimulus meets or is above a threshold (518). When the ratio is determined to be above this threshold, remote server 104 may then remove the transmitted stimulus from stimulus database 122 (520). Consistent with some embodiments, remote server 104 may not automatically remove the transmitted stimulus from stimulus database 122 when the ratio is above the threshold. Instead, remote server 104 may calculate an output that identifies the transmitted stimulus as being statistically vulnerable. At this point, remote server 104 may simply note the vulnerability in stimulus database 122 and take action later. When the ratio is not determined to meet or be above the threshold, nothing may be done, and the session may be ended (512). Although the steps shown in FIG. 5 are described as being performed by remote server 104, they may also be performed by client computing device 102, or a combination thereof.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide methods, systems, and devices capable of automatically identifying and removing stimuli used in a stimulus based authentication system that are determined to be weak or insecure. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An authentication system, comprising:
    a non-transitory memory configured to store a plurality of stimulus challenges, a respective first count associated with each stimulus challenge of the plurality of stimulus challenges, and a respective second count associated with each stimulus challenge of the plurality of stimulus challenges;
    a network interface component; and
    one or more hardware processors coupled to the non-transitory memory and the network interface component, the one or more hardware processors configured to execute instructions to cause the authentication system to perform operations comprising:
    selecting a first stimulus challenge from the plurality of stimulus challenges;
    transmitting, using the network interface component, the first stimulus challenge to a user;
    receiving, via the network interface component, a response to the first stimulus challenge;
    incrementing the respective first count associated with the first stimulus challenge in cases where the first stimulus challenge is transmitted and the response is received;
    incrementing the respective second count associated with the first stimulus challenge in cases where a successful response to the stimulus challenge is detected and an authentication session including the first stimulus challenge fails;
    determining a ratio of the respective second count to the respective first count;

comparing the ratio to a threshold;
removing the first stimulus challenge from the plurality of stimulus challenges when the ratio is greater than the threshold; and
outputting an indication that the first stimulus challenge is statistically vulnerable to attack.

2. The authentication system of claim 1, wherein the operations further comprise generating a log of the successful and unsuccessful responses and storing the log.

3. The authentication system of claim 1, wherein each of the stimulus challenges comprises at least one of an image, a transformation, media, word or number strings, or a combination thereof.

4. The authentication system of claim 1, wherein a successful response comprises a successful selection, manipulation, or identification of the first stimulus challenge and an unsuccessful response comprises a failed selection, manipulation, or identification of the first stimulus challenge.

5. The authentication system of claim 1, wherein the operations further comprise transmitting the first stimulus challenge in response to receiving an authentication request from the user.

6. The authentication system of claim 1, wherein the operations further comprise transmitting additional stimulus challenges and received additional responses in response to an authentication request.

7. A method comprising:
transmitting, by a network interface component of a server, a first stimulus challenge selected from a plurality of second stimulus challenges during a stimulus-based authentication session;
receiving, by the server via the network interface component, a response to the first stimulus challenge;
increasing, by one or more hardware processors of the server, a first count indicating a number of times the first stimulus challenge is transmitted and a response is received;
increasing, by the one or more hardware processors, a second count associated with the first stimulus challenge when the received response is a successful response to the first stimulus challenge and the authentication session fails;
determining, by the one or more hardware processors, a ratio of the second count to the first count; and
indicating, by the one or more hardware processors, that the first stimulus challenge is vulnerable when the determined ratio exceeds a threshold.

8. The method of claim 7, further comprising removing, by the one or more hardware processors, the first stimulus challenge from the plurality of second stimulus challenges when the determined ratio exceeds the threshold.

9. The method of claim 7, wherein the first stimulus challenge comprises at least one of an image, a transformation, media, word or number strings, or a combination thereof.

10. The method of claim 7, wherein an unsuccessful response to the first stimulus challenge results in failure of the authentication session.

11. The method of claim 7, wherein the authentication session comprises:
transmitting, by the network interface component of the server, an additional stimulus challenge; and
receiving, by the server via the network interface component, an additional response to the additional stimulus challenge.

12. A non-transitory machine-readable medium having stored thereon machine-readable instructions executable to cause a machine to perform operations comprising:
transmitting a first stimulus challenge selected from a plurality of second stimulus challenges in response to an authentication request;
receiving a response to the first stimulus challenge;
incrementing a first count associated with the first stimulus challenge in cases where the first stimulus challenge is transmitted and the response received;
incrementing a second count associated with the first stimulus challenge in cases where a successful response to the first stimulus challenge is detected and an authentication session including the first stimulus challenge fails;
determining a ratio of the second count to the first count;
comparing the ratio to a threshold; and
determining that the first stimulus challenge is statistically vulnerable to attack and removing the first stimulus challenge from the plurality of second stimulus challenges when the ratio is greater than the threshold.

13. The non-transitory machine-readable medium of claim 12, wherein the operations further comprise:
generating a log of the transmitting of the first stimulus challenge and the received response; and storing the generated log.

14. The non-transitory machine-readable medium of claim 12, wherein the first stimulus challenge comprises at least one of an image, a transformation, media, word or number strings, or a combination thereof.

15. The non-transitory machine-readable medium of claim 12, wherein the response comprises a selection, manipulation, or identification of the first stimulus challenge.

16. The non-transitory machine-readable medium of claim 12, wherein the operations further comprise transmitting additional stimulus challenges and receiving additional responses in response to the authentication request.

17. The non-transitory machine-readable medium of claim 12, wherein successful authentication includes a determination that the received response is a successful response to the first stimulus challenge.

* * * * *